United States Patent [19]
Winski

[11] Patent Number: 4,988,264
[45] Date of Patent: Jan. 29, 1991

[54] APPARATUS FOR HANDLING MATERIAL
[75] Inventor: Ernest P. Winski, Oshkosh, Wis.
[73] Assignee: Kinetic Robotics, Inc., Menasha, Wis.
[21] Appl. No.: 309,044
[22] Filed: Feb. 8, 1989

Related U.S. Application Data
[63] Continuation of Ser. No. 888,511, Jul. 23, 1986, abandoned.

[51] Int. Cl.$^5$ .............................................. B65G 59/02
[52] U.S. Cl. ................................... 414/196; 108/51.3; 108/52.1; 221/92; 221/106; 414/417; 414/796.2; 414/796.8
[58] Field of Search ................. 414/417, 795.8, 796, 414/796.2, 796.8, 790.4; 108/51.3, 52.1, 53.1, 901; 221/92, 106, 112, 133

[56] References Cited

U.S. PATENT DOCUMENTS

| | | | |
|---|---|---|---|
| 2,243,919 | 6/1941 | Paxton et al. | 414/96 X |
| 2,656,047 | 10/1953 | Samler | 414/114 |
| 2,937,482 | 5/1960 | Lazott et al. | 414/96 X |
| 2,940,617 | 6/1960 | Reed | 414/114 |
| 2,978,125 | 4/1961 | Freeman | 414/96 X |
| 3,105,598 | 10/1963 | Magnuson | 414/119 X |
| 3,389,810 | 6/1968 | Wolfe et al. | 414/796.8 X |
| 3,534,872 | 10/1970 | Roth et al. | 414/796.2 |
| 3,637,093 | 1/1972 | Brockmuller et al. | 414/66 |
| 3,682,338 | 8/1972 | VonGal, Jr. et al. | 414/796.2 |
| 3,720,176 | 3/1973 | Munroe | 108/53.1 X |
| 3,836,018 | 9/1974 | Dawson et al. | 414/790.4 X |
| 3,884,368 | 5/1975 | Ballard | 414/797.1 X |
| 3,946,883 | 3/1976 | Beal | 108/51.3 X |
| 3,986,620 | 10/1976 | Wilde et al. | 414/790.4 |
| 4,032,021 | 6/1977 | Mabey et al. | 414/119 |
| 4,162,016 | 7/1979 | Schmitt | 414/85 |
| 4,172,686 | 10/1979 | Shorthouse | 414/114 |
| 4,195,959 | 4/1980 | Schmitt | 414/35 |
| 4,397,246 | 8/1983 | Ishida et al. | 108/901 X |
| 4,671,723 | 6/1987 | Feldkämper | 414/114 |
| 4,708,247 | 11/1987 | Liebel | 206/449 X |

FOREIGN PATENT DOCUMENTS
650703  2/1951  United Kingdom .............. 108/51.3

Primary Examiner—Robert J. Spar
Assistant Examiner—Janice Krizek
Attorney, Agent, or Firm—Thomas D. Wilhelm

[57] ABSTRACT

Material handling apparatus and methods, especially for use with loose stacks of paper and the like in pallets. The invention includes depalletizing apparatus, distributing apparatus, and hopper loading apparatus; and material handling apparatus for transporting material between the depalletizing apparatus, the distributing apparatus, and the hopper loading apparatus. The depalletizing operation includes lateral sliding of layers of a pallet load onto a removal conveyor and then away from the pallet. Significant advantages are achieved by using a special spacing sheet in the pallet load instead of slip sheets and tie sheets. Fingers on the pusher extend below individual layers of the load and into the channels in a spacing sheet, effecting the removal of even the bottom layer of papers in a stack. Similar use of fingers and channels applies to operation of the hopper loader and its control of the bottom papers in the stack. Accumulator apparatus is used as desired for staging appropriate materials throughout the system. Spacing sheets and empty pallets are automatically removed from the depalletizer, to collection and storage areas.

10 Claims, 12 Drawing Sheets

APPARATUS FOR HANDLING MATERIAL

This application is a continuation of application Ser. No. 888,511, filed July 23, 1986, now abandoned.

BACKGROUND OF THE INVENTION

This invention pertains to apparatus and methods for material handling, and especially for the palletizing and depalletizing of materials, and, optionally, the distribution of those materials to specific locations. The invention especially pertains to apparatus and processes for the handling of stacks of loose materials such as newspaper and loose sheets of paper, and the like, in conjunction with loading the materials onto a pallet and subsequently unloading the materials using a depalletizer, and optionally distributing them to a subsequent work station, and loading them into a hopper.

Apparatus for palletizing bundles of newspaper into a pallet load are known in the art. My U.S. Pat. No. 4,704,060, which issued from Ser. No. 770,268, filed Aug. 28, 1985, which is a continuation-in-part of application Ser. No. 746,997, filed June 19, 1985, now abandoned, incorporated herein by reference teaches apparatus and methods for palletizing loose stacks of paper such as newspaper. To the inventor's knowledge, apparatus for unloading a pallet load of loose materials is unknown, as is unloading a pallet load by sliding the load off the pallet.

Palletizers have achieved substantial use for loading cases of material onto a pallet in layers typically with a slip sheet on the bottom of the load and tie sheets between the layers. In my U.S. Pat. No. 4,704,060, which issued from Ser. No. 770,268 filed Aug. 28, 1985, which is a continuation-in-part of application Ser. No. 746,997, now abandoned, there is disclosed palletizing apparatus for loading layers of loose paper, such as stacks of newspaper, onto a pallet.

It is believed that the unloading of pallets, and particularly pallets of loosely stacked materials, is generally done by hand. The problem with handling loose materials with a pallet unloading apparatus is that each unit of material must be acted upon in some way, by the apparatus, to effect the desired movement. With the small thickness of, for example, paper, it is easy for sheets, particularly those near the bottom of a stack, to be missed by that material handling apparatus which functions by action on a side of the stack, at the edges of the sheets. Yet, efficient material handling of thin sheets typically is done through interactions at the sheet edges.

Papers are conventionally taken manually from a pallet load and stacked into a hopper for further processing. Since removal of material from the pallet load and placing it in the hopper are manual operations, it would be desirable to provide apparatus to perform each of those operations, as well as apparatus to transport the material from the depalletizing apparatus to the hopper loading apparatus.

It is an object of this invention to provide apparatus and methods for automatically unloading material, and especially stacks of loose materials such as newspaper, from a pallet. In some embodiments, the most efficient unloading begins with a particular method of loading the pallet which is conducive to easy unloading.

Another object is provision of apparatus and process for distributing stacks of material to selected ones of a plurality of workstations.

Yet another object is provision of apparatus and process for loading stacks of paper into a hopper.

Finally, it is an object of the invention to provide a system of apparatus and process for depalletizing material, transporting it to a subsequent workstation, which may be selected from a plurality of workstations, and loading it into a hopper at the workstation.

SUMMARY OF THE INVENTION

These and other objects are seen to be embodied in depalletizing apparatus for removing a load of material from a pallet. The apparatus includes, first, means for holding a pallet having a load, in a predetermined location as by retaining bars and stops about the sides and ends of a pallet, on a pallet carrier. Secondly, the depalletizing apparatus includes a removal conveyor which is horizontally, and by vertical projection, adjacent to the pallet holding means, although the removal conveyor may be, and usually is, in a plane vertically above the pallet. Thirdly, the apparatus includes a pushing means, usually a pushing plate, for pushing the materials off the pallet load and onto the removal conveyor means. The pushing means preferably has finger extensions spaced along one edge for projection toward the pallet when the pushing means is pushing material off the pallet.

Particularly for use with pallet loads having a plurality of layers, and wherein the load is to be unloaded a layer at a time, the apparatus has the capability for effecting vertical movement of the pallet relative to the removal conveyor. Either the pallet, or the removal conveyor, or both, may move vertically.

Usually, in conventional pallet loading, a slip sheet is used under the bottom layer of material and tie sheets are used under all other layers. In preferred embodiments of the invention, the pallet load includes special spacing sheets of the invention under each layer of material, in place of a slip sheet and tie sheets.

There are many known and contemplated embodiments and features of the spacing sheet. It generally has a first upper facing surface having a relatively low coefficient of friction. The spacing sheet preferably has an overall minimum thickness of at least about 0.25 inch, at least about 0.375 inch being better, with a preferred thickness of about 0.75 inch, and most preferably about 1.0 inch, for reasons which are explained hereinafter. In the preferred embodiments of the invention, the spacing sheet has sufficient thickness and rigidity that movement of the sheet may be prevented while a load is being slid off it, by holding a retainer bar, or the like, against the corresponding edge of the spacing sheet to keep it from sliding with the load.

The spacing sheet usually has a plurality of generally parallel channels extending generally across its upper surface and terminating at one of the top edges. The lower surface may also have a plurality of spaced apart surface elements, which may define a pattern having parallel relationships and a second definable parallel direction. It is preferred that the parallel direction defined by the pattern of surface elements on the lower surface be substantially different from the direction of the channels in the upper surface; most preferably the two directions are perpendicular to each other. In some embodiments the lower facing surface has more capability to resist sliding than does the upper surface. This may take the form of a higher coefficient of friction. It may also take the form of a multiplicity of projections from the lower surface.

The spacing sheet may comprise first and second sheets of corrugated media fastened to each other at a common interface, to form the spacing sheet, with the corrugations facing outwardly from the common interface. In these embodiments the corrugations in the media are substantially perpendicular to each other, and a thickness of at least about 0.375 inch is preferred.

In preferred pallet loading of the invention, the spacing sheet is oriented in the pallet load such that the channels in the upper surface are generally aligned with what will be the removal direction of the removal conveyor in depalletizing operations using this invention.

Preferred depalletizing apparatus of the invention includes a retaining means for preventing movement of an underlying portion of the pallet load, such as a spacing sheet and underlying layers of material, while an overlying portion of the load is being removed. It is preferred that the retaining means is a bar, and that it be compatible with surface-to-surface contact with an edge of the spacing sheet when contents of the pallet load are being removed.

In conjunction with the use of the removal conveyor, the depalletizing apparatus may use a spacing conveyor at the discharge end of the removal conveyor. The spacing conveyor is driven at a faster linear speed than the linear speed of the removal conveyor. Finally, there may be a take-away conveyor at the discharge end of the spacing conveyor. The take-away conveyor has a direction of conveyance generally angular, and preferably perpendicular, to the direction of conveyance of the spacing conveyor.

Preferred embodiments also include means for removing the spacing sheet from the top of the remainder of a pallet load, and means for moving it laterally away from the pallet. They also include means for removing an empty pallet from the pallet holding area, and pallet collecting means, including a carriage and carriage lift means for lifting a pallet from a lower position of the carriage lift means into the bottom of a stack of pallets, whereby the pallet becomes part of the stack, and pallet stack holding means for holding a stack of pallets above the carriage lift means as determined when the carriage lift means is in the lowered position.

Some embodiments of the depalletizing apparatus have a plurality of pallet holders on a pallet carrier, such that a plurality of pallets may be loaded onto the pallet carrier for feeding pallet loads, or parts thereof, through the depalletizer.

The depalletizing apparatus may also include a plurality of accumulators beyond the discharge locus of the removal conveyor.

The invention includes methods of removing a load of material from a pallet. The steps include holding the pallet in a predetermined feed location, pushing material, which is on the pallet, off the pallet load and onto a removal conveyor, and conveying the material away from the pallet. For most effective operation of the removal, the relative vertical height of the pallet and removal conveyor are adjusted for effective sliding of a row of the pallet load onto the conveyor. Likewise, it is desirable that underlying portions of the pallet load be held, so they are prevented from moving off the pallet as the top row is being pushed off. Typical holding is by means of a retaining bar in surface-to-surface contact with either an edge of the spacing sheet or a portion of the underlying layer.

The advantages and features of the invention are most easily seen when the invention is applied to a load of material which is loosely stacked on the pallet; and particularly loosely stacked newspaper or newspaper sections. In this use, the movement of an entire layer of stacked newspaper, for example, requires the pushing of the paper by a pusher at every elevation along the height of a stack. In a conventional pushing, the bottom papers may slip under the pusher. In this invention, a special spacing sheet is used under the loosely stacked material. The spacing sheet has a plurality of generally parallel channels in its top surface; and the top of the spacing sheet is substantially coincident with the bottom of the overlying layer. The pusher has a plurality of fingers which extend into the channels. The bottoms of the channels and the ends of the fingers are both below the bottom of the layer being pushed, such that the pusher effectively pushes the bottom of the loose stack as well as the middle and top of the loose stack.

A method of the invention typically includes discharging the material from the removal conveyor onto a spacing conveyor which is running at a higher linear speed than the removal conveyor; and finally the material may be discharged from the spacing conveyor onto a take-away conveyor for conveyance in a direction generally angular to the direction of conveyance of the spacing conveyor, preferably in a direction perpendicular to the direction of conveyance of the spacing conveyor.

After removal of the contents of a layer of the load, the underlying spacing sheet, now on top of the load, is removed by lifting the spacing sheet and moving it laterally away from the pallet. The pallet height may then be adjusted, as necessary, to present the next layer at a vertical height cooperative with sliding movement of the next layer onto the removal conveyor. The above steps of presenting and unloading layers are repeated until the pallet is empty, including removal of the last spacing sheet. The empty pallet is then removed laterally from its location to a carriage in a pallet collector. There the pallet is lifted on the carriage into the bottom of a stack of pallets whereby the pallet becomes part of the stack. The stack is held there above the carriage by stack holding means.

In another embodiment of the method, a plurality of pallet loads may be staged sequentially into the depalletizer for partial depalletizing. Specifically, when a portion of a pallet load, such as a layer, has been removed, the pallet, and its remaining load, are moved from the feed location and a second pallet and its load are brought to the feed location and any necessary height adjustment made. Material is then pushed off the second load and onto the removal conveyor. Additional pallet loads or load portions are sequenced into the feed location as desired, preferably by use of a pallet carrier which carries the affected pallets to and from the feed location. As material is removed from the several pallet loads, it may be fed to a corresponding number of accumulators.

The method of the invention has its beginning in the loading of the material onto the pallet. An important part of the invention, as it applies to use with loosely stacked articles such as newspaper, is in placing one of the special spacing sheets of the invention, having the channels in the top surface, under each layer, such that the top surface of each spacing sheet is coincident with the bottom of the corresponding overlying layer. The spacing sheets on any given pallet load are oriented according to the direction predetermined to be the direction of sliding movement when the material on the spacing sheets is removed.

The advantages of the invention are seen in unloading the pallet. The pallet is held in position, is adjusted for vertical height, and the top layer is pushed off. Fingers on the pusher extend into the channels, effectively reaching below the lower-most paper in the stack, such that the entire stack is reliably removed from the pallet.

Another embodiment of the invention is in a loaded pallet using special spacing sheets of the invention. The pallet is loaded with one or more layers of material, and at the bottom of each layer is a spacing sheet. The load, then, from bottom to top is:
(a) pallet
(b) spacing sheet
(c) layer of material
(d) spacing sheet
(e) layer of material
alternating spacing sheets with layers of material.

Another portion of the invention is in a method of handling pallets with a pallet handling device. The first step in the method is lifting a pallet by a carriage from a lower position to a higher position at the bottom of a stack of pallets which are being held by a pallet stack holder. The pallet stack holder has a plurality of fingers for holding the stack. As the pallet is lifted by the carriage the fingers are withdrawn from the stack and the pallet is lifted into the bottom of the stack thereby becoming a part of the stack. The fingers are then reinserted into the stack, namely into that bottom pallet which has just been lifted into the stack, thus holding the stack once again. The carriage may then be returned to its lower position.

The pallet handling device includes a drive means which has a circular motion member attached to the carriage. The circular motion member also has a cam on it for interaction with the stack holder. The method includes driving the circular motion member in one direction one rotation to collect a pallet from the carriage lower position into the stack, and driving the circular motion means in the opposite direction one rotation to dispense a pallet from the stack onto the carriage and lower the carriage to the lower position.

Another portion of the invention is in a distributor for distributing loose stacks of material. The distributor has a staging area, means for receiving material onto the staging area at a first elevation, means for changing the staging area to a second elevation and rotating it about a vertical axis, means for changing the elevation of the staging area from the second elevation after rotation about the vertical axis, and means for discharging material from the staging area. Typically the means for receiving and discharging the material is a two-way conveyor. The process for using the distributor is as indicated in the functional description of its various parts.

Another portion of the invention is in a hopper loader. The loader has receiving means for receiving a load of material onto the loader. When the loader has a load of material on it the receiving means is under the load and supports the load. The hopper further has means for laterally moving the receiving means out from under the received material, and restraining means for preventing lateral movement of the material with the receiving means during the lateral movement of the receiving means.

Particularly where the hopper loader is to be used with loose stacks of papers, the receiving means has a definable top surface, which may be composed of a plurality of surface elements, having a plurality of channel means therein extending in the direction of lateral movement of the receiving means. Where the receiving means has the channels in its top surface, the restraining means may have a plurality of fingers extending into the channels. The receiving means typically is a roller conveyor with the rollers including the above described channels. The roller conveyor and the restraining means typically are connected to a common framework. The hopper loader may include an accumulator, as in the form of a driven conveyor for feeding a load of material onto the receiving means.

The loading of a hopper, using the hopper conveyor, begins by receiving a load of material onto the receiving means. Where the driven conveyor is used the material is received first onto the driven conveyor and is delivered from the driven conveyor onto the receiving means. When the material is received on the receiving means it is supported by the receiving means. The receiving means is then laterally moved out from under the material while preventing the lateral movement of material with the receiving means during that lateral movement. The material is prevented from moving by the restraining means which is properly positioned for restraining the material.

Another portion of the invention is embodied in a combination of apparatus for distributing material to a plurality of workstations and loading that material into hoppers at the workstations. The apparatus, then, includes a distributor for distributing a plurality of loads of material to a plurality of workstations, by receiving the material onto a staging area, and changing the elevation of that staging area and rotating it about a vertical axis in order to present it to the appropriate workstation, and adjacent discharge loci of the distributor, hopper loaders capable of receiving material discharged from the distributor and loading it into the respective hoppers. The hopper loaders may comprise accumulators between the distributor and receiving area of the hopper loader. The hopper loaders may further include level detectors for detecting the level of material in a given hopper.

The invention is also seen to be embodied in a system of material handling apparatus which comprises a depalletizer, a distributor for receiving material from the depalletizer and distributing it to a selected one of the plurality of workstations, and a loader for loading material into a hopper at each of the workstations. The system may optionally include accumulator apparatus between the depalletizer and the distributor and between the distributor and the loader.

In the process of using this system, material is depalletized from a pallet load by means of pushing elements of the load off the load and delivering them to a distributor. The distributor distributes each load element to one of a plurality of work stations and the corresponding hopper loader of the work station. The corresponding loaders load the load elements into the corresponding hoppers.

The depalletizing apparatus may deliver load elements to one or more accumulators between the depalletizer and the distributor. The load elements are then released from the accumulators to the distributor at the appropriate time. The distributor may deliver the load elements to accumulators on the respective hopper loaders. The load elements are then delivered from the accumulator to the hopper loader receiving means at the appropriate time.

BRIEF DESCRIPTION OF THE DRAWINGS

FIG. 4 shows a pictorial view of a spacing sheet of this invention; while

DETAILED DESCRIPTION OF THE ILLUSTRATED EMBODIMENT

Figure 1:
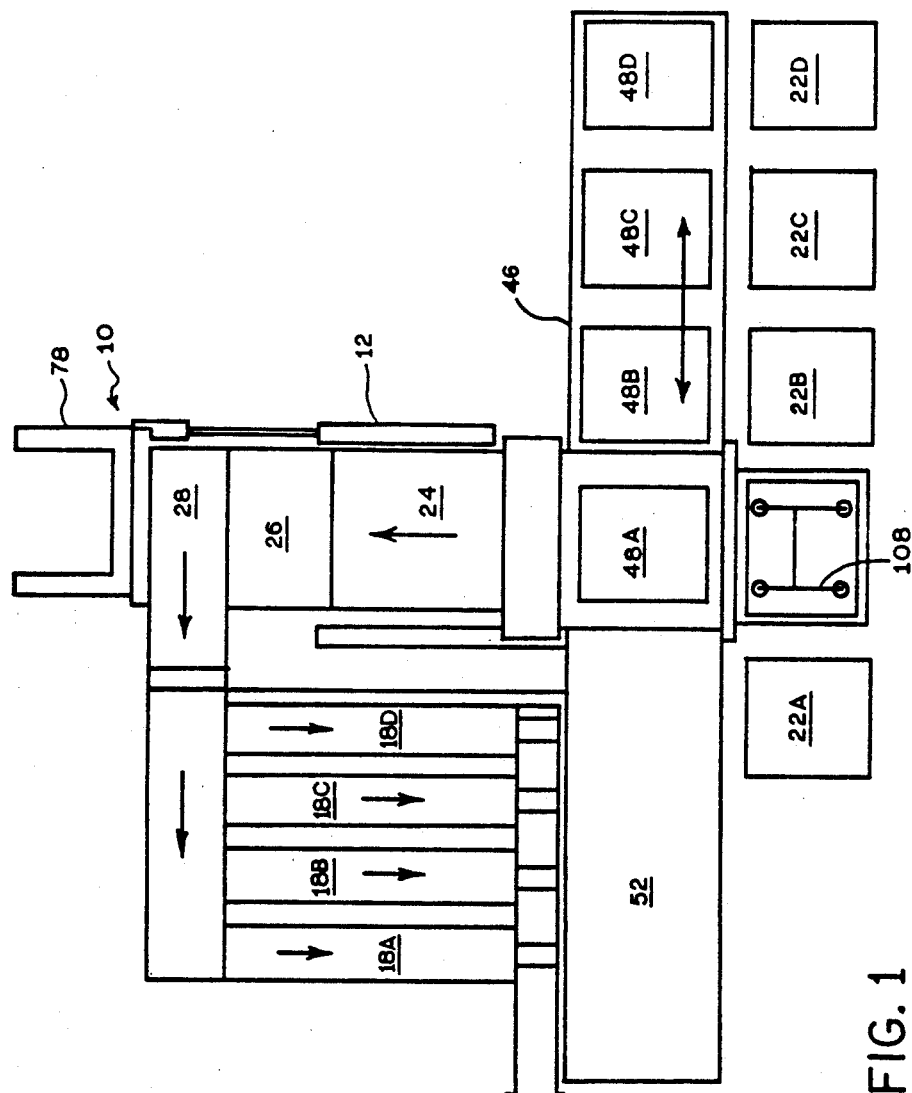
FIG. 1 shows a top view of an overall layout including material handling system of this invention.

The material handling system of the invention addresses the operations of unloading a pallet, in some cases separating elements of the load from each other, or elements of a plurality of loads from each other, distributing the several loads to selected ones of a plurality of workstations, and loading the load elements into hoppers at the workstations. In dealing with these various aspects, the inventor has addressed a plurality of problems, and has developed solutions to those problems. Thus the description herein addresses a plurality of portions of the invention. The overall invention is illustrated in a top view in FIG. 1, wherein apparatus of the material handling system is generally indicated as 10. The material handling system includes three basic components, namely a depalletizer 12, a distributor 14, and hopper loaders 16. The system optionally includes a plurality of accumulators 18 between depalletizer 12 and distributor 14. The general flow of material in the material handling system is from the depalletizer 12 to one or more of the accumulators 18, from the accumulator 18 to distributor 14, from distributor 14 to an appropriate one of the hopper loaders 16.

THE DEPALLETIZER

Figure 2:
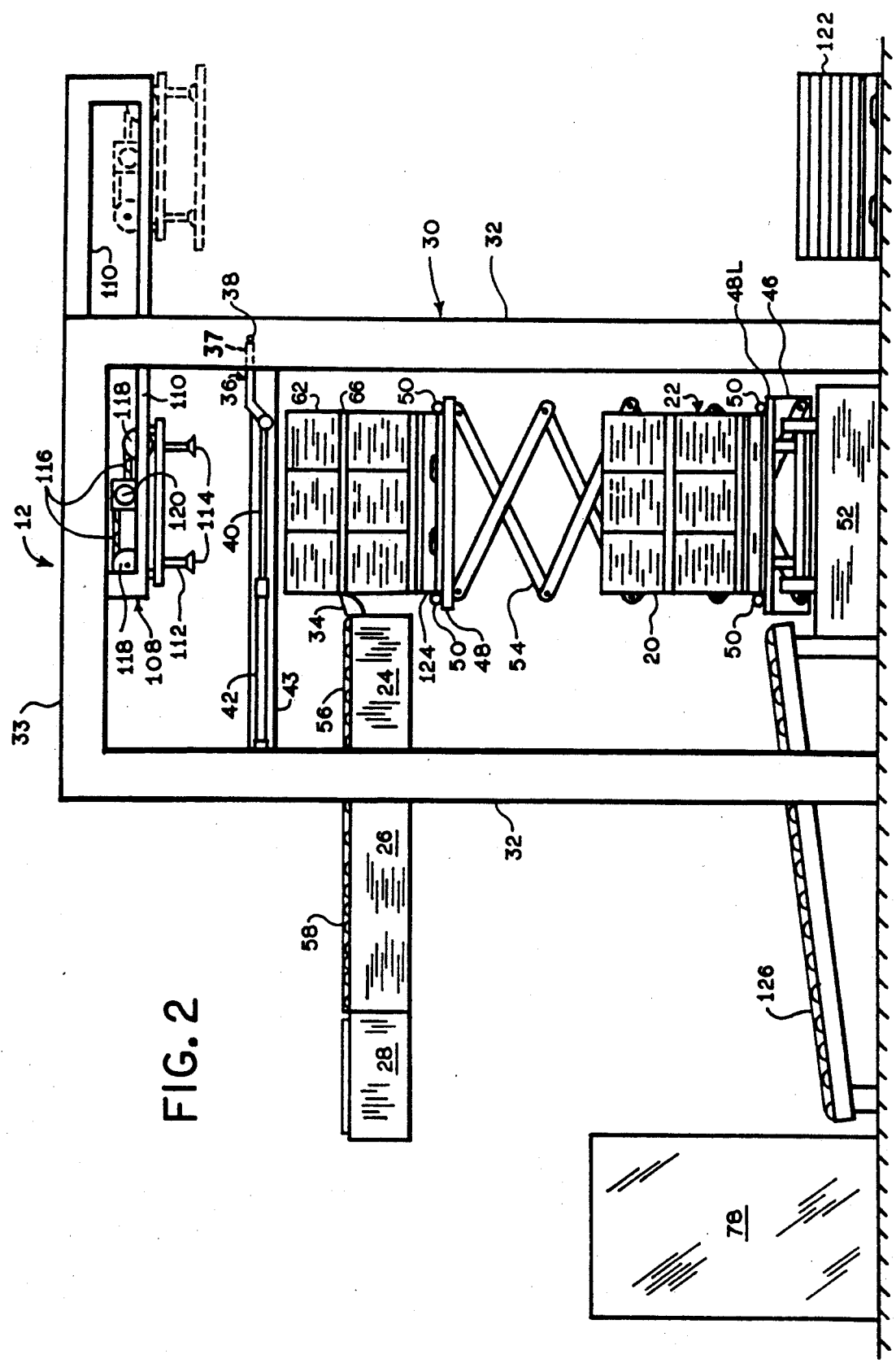
FIG. 2 shows a side elevation view of a depalletizer of the invention having a pallet in position for unloading a portion of the pallet load.
Figure 3:
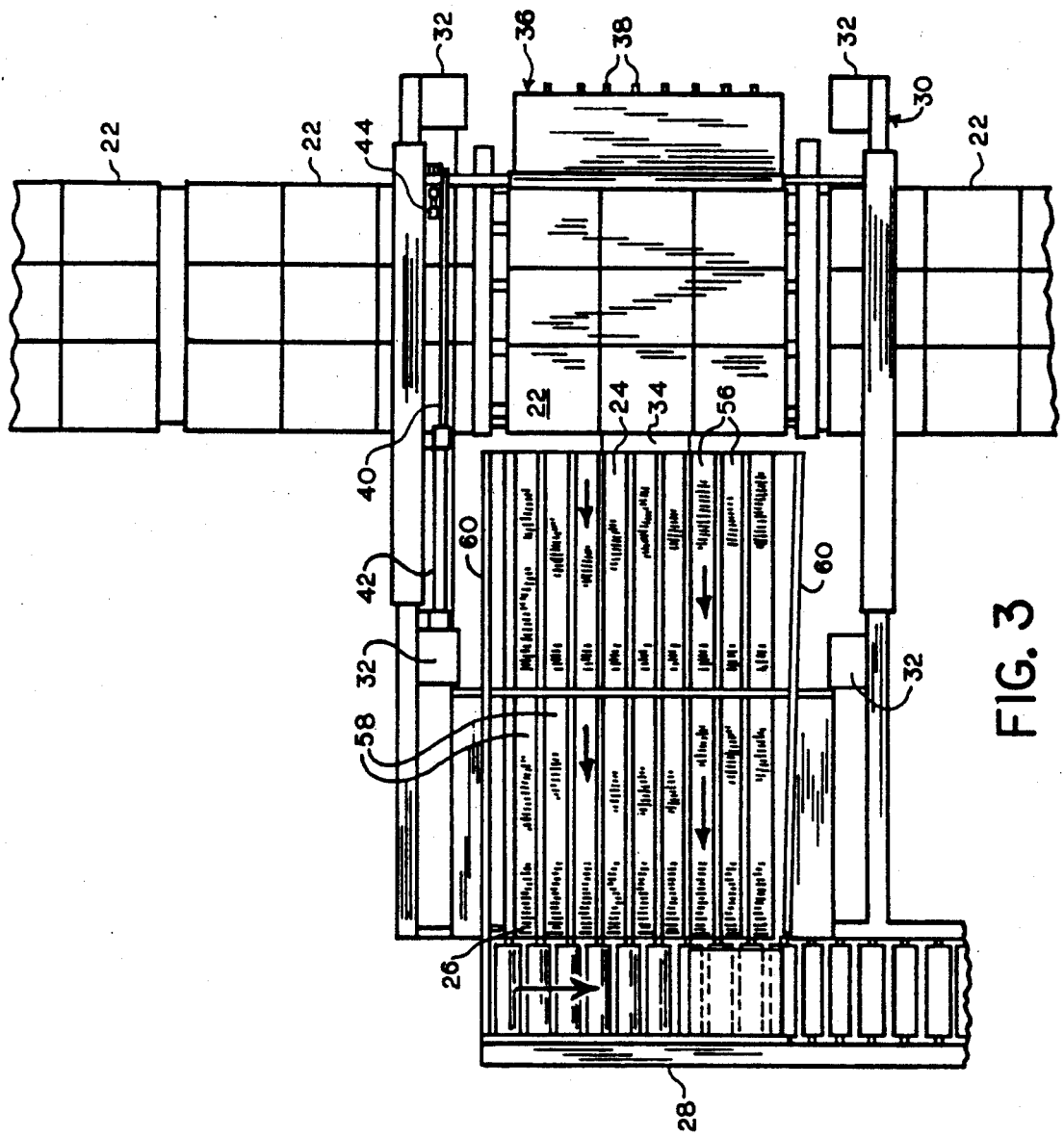
FIG. 3 shows a top view of the depalletizer of FIG. 2.

FIGS. 2 and 3 show side elevation and top views of the primary components of a preferred depalletizer of the invention. The depalletizer 12 is useful for removing stacks 20 or other layers, of materials such as papers, from a pallet load 22 and delivering them onto a removal conveyor 24 for transport away from the pallet. Spacing conveyor 26 is at the discharge end of the conveyor 24, namely that end of conveyor 24 which is remote from the pallet load 22. Take-away conveyor 28 is at the discharge end of spacing conveyor 26.

Figure 7:
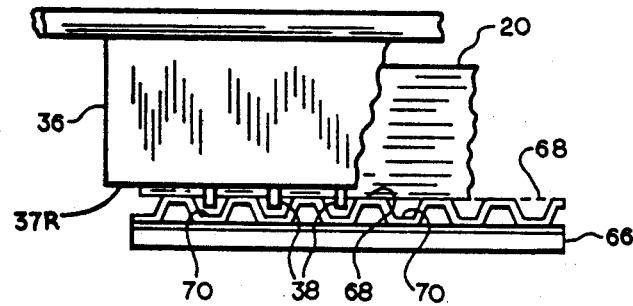
FIG. 7 is a partial elevation view taken at 7—7 of FIG. 6.
Figure 6:
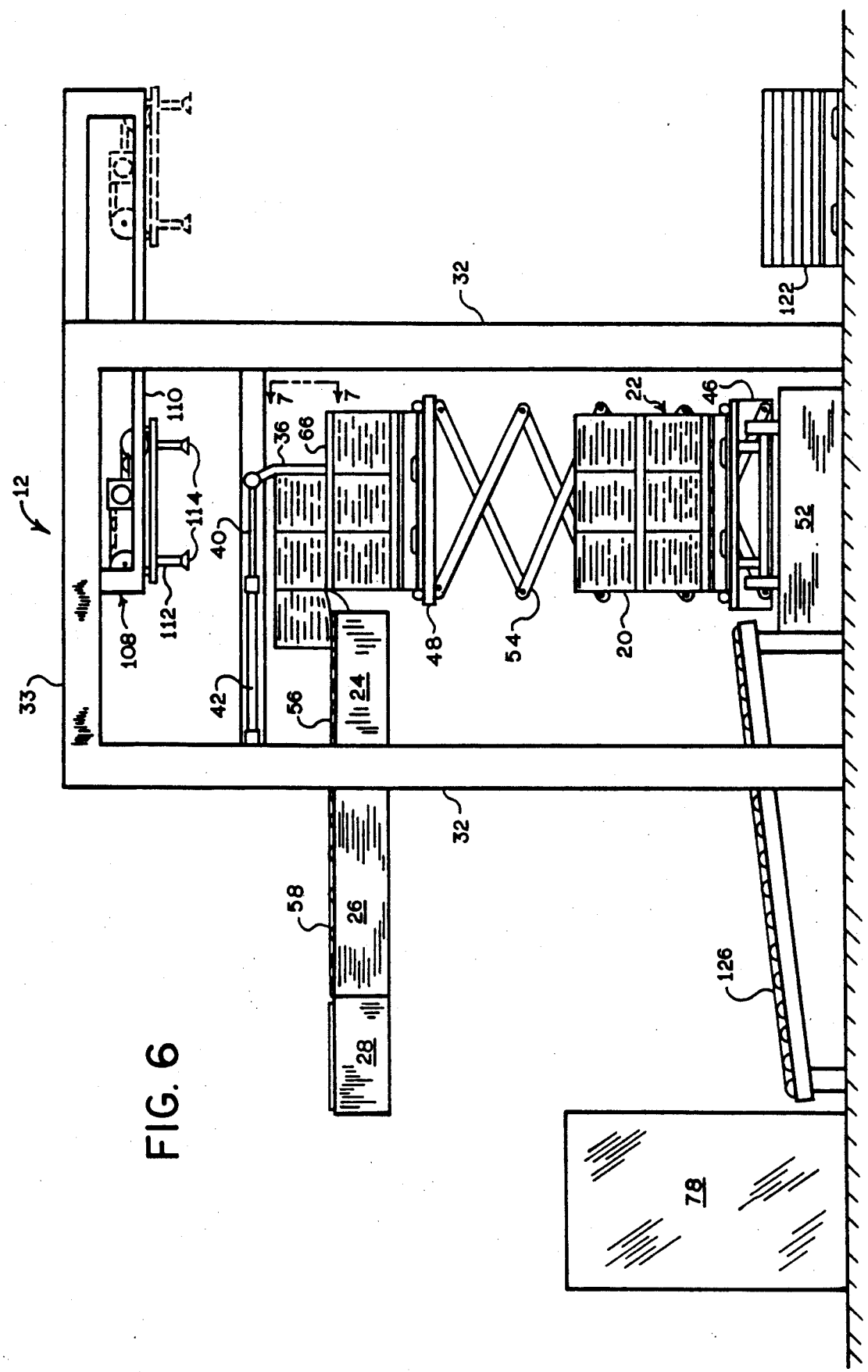
FIG. 6 shows a side elevation view as in FIG. 2 with the top layer being pushed off the pallet.
Figure 8:
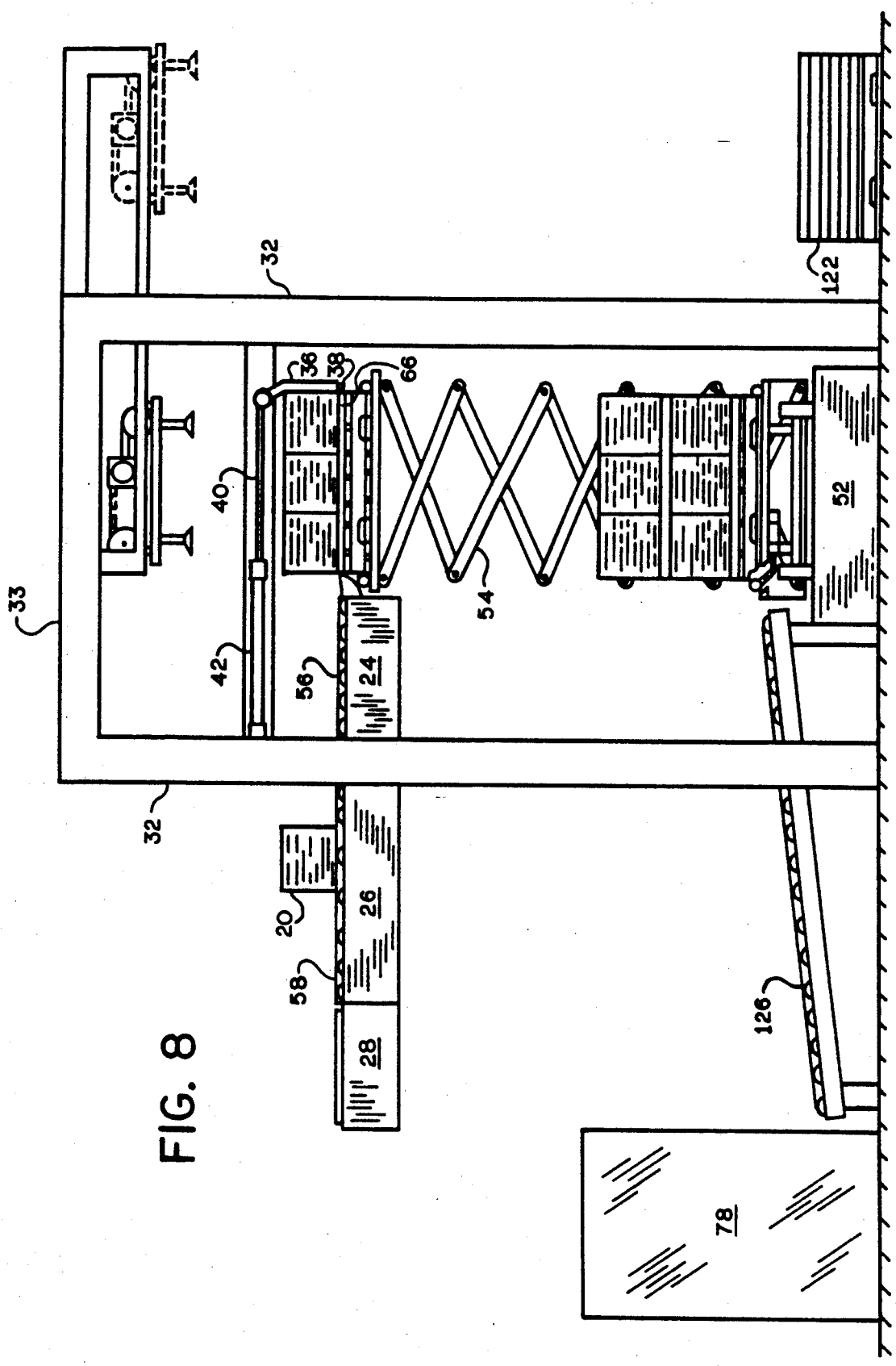
FIG. 8 is a side elevation view as in FIG. 6 with the pallet having been further raised for removal of the bottom layer.

The depalletizer 12 includes a frame 30 having generally vertical members or posts 32. Posts 32 are connected in the upper portion of the depalletizer by a plurality of upper horizontal frame members 33. The depalletizer includes a load retainer 34 mounted adjacent removal conveyor 24. The depalletizer further includes a pusher 36 having a generally continuous surface 37 and fingers 38, as seen in FIGS. 2 and 3. Generally continuous pushing surface 37 extends substantially the full width of the load layer 62 to be removed as seen in FIGS. 3 and 7, and substantially the full height of the load layer to be removed as seen in FIGS. 6, 7, and 8. Pusher 36 is mounted on the end of rod 40 of retractable cylinder 42. Cylinder 42 is mounted to frame 30 at horizontal member 43. Optionally a second, and companion, cylinder 42 may be used on the opposite side of the depalletizer and similarly connected to pusher 36. Pusher 36 is rotated about its axis of rotation by activation of cylinder 44, seen in FIG. 3.

A pallet carrier 46 has a plurality of pallet tables 48 for receiving pallet loads 22. Each pallet table has a plurality of pallet guides 50 for locating the pallet into an appropriate position when it is loaded onto the pallet table. Appropriate ones of pallet guides 50 are retractable in a normal manner, in order to facilitate loading of the pallets onto the pallet tables. Carrier track 52 is a track, or other appropriately defined means of guiding the movements of carrier 46.

The pallet tables are lifted as by the scissors jack 54 shown.

Removal conveyor 24 is preferably comprised of one or more endless belts 56 which move in a generally horizontal position, to pick up and transport material removed from the pallet load 22. Removal conveyor 24 transports the material towards spacing conveyor 26 as shown by the arrows in FIG. 3 and discharges the material onto spacing conveyor 26. Spacing conveyor 26 is preferably comprised of one or more endless belts 58. Spacing conveyor 26 transports the material in the same general direction as removal conveyor 24, and at a higher rate of speed, and discharges it onto take-away conveyor 28. Take-away conveyor 28 collects the material and takes it away from the depalletizer area.

Side guides 60 seen in FIG. 3 on either side of conveyors 24 and 26 contain the material, guide it, and prevent it from falling off the sides of conveyors 24 and 26.

Figure 5:
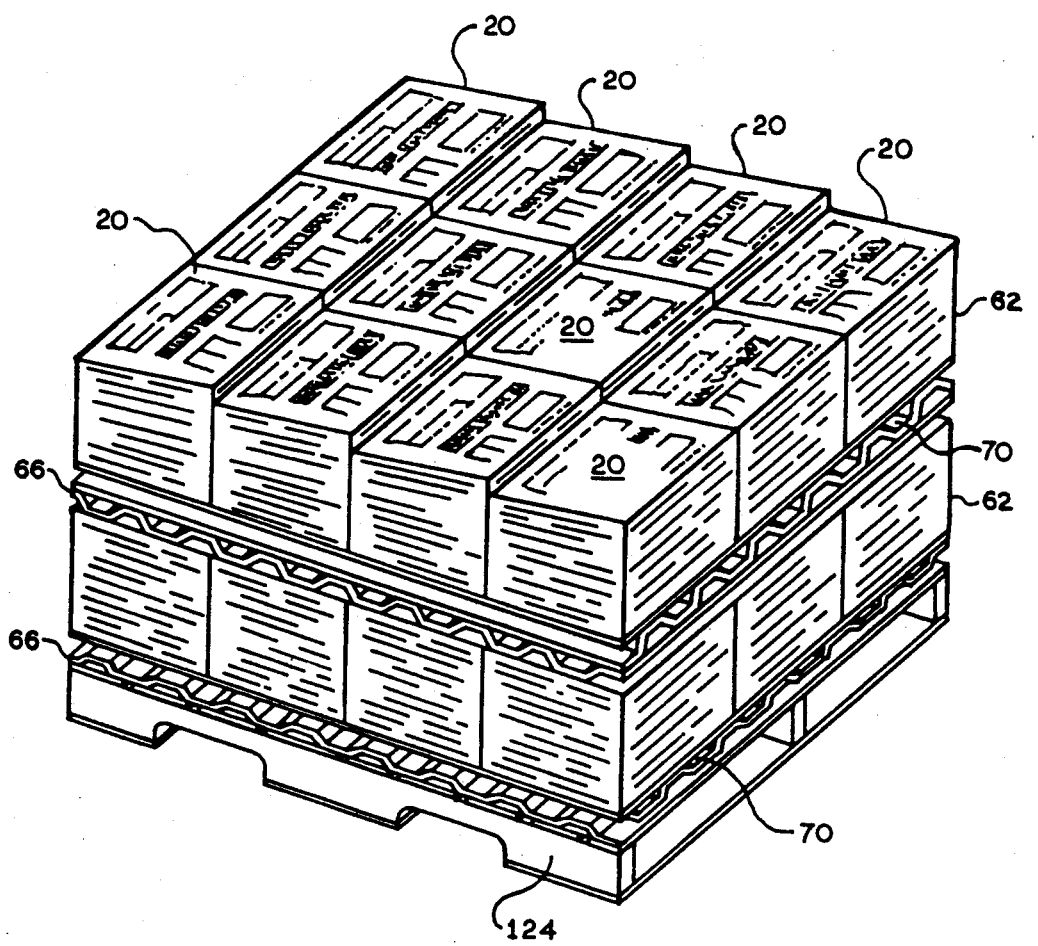
FIG. 5 shows a loaded pallet wherein the load includes spacing sheets of FIG. 4.

In the preferred embodiments of depalletizing according to the invention, the pallet load 22 as seen in FIG. 5 is made up of one or more layers 62 of material. Each layer may include a plurality of stacks, bundles, or cases 20 or the like, of material. FIG. 5 shows two layers 62 of loose material, such as newspaper, each layer 62 having twelve stacks 20. Under each layer 62 is a spacing sheet 66.

Figure 4:
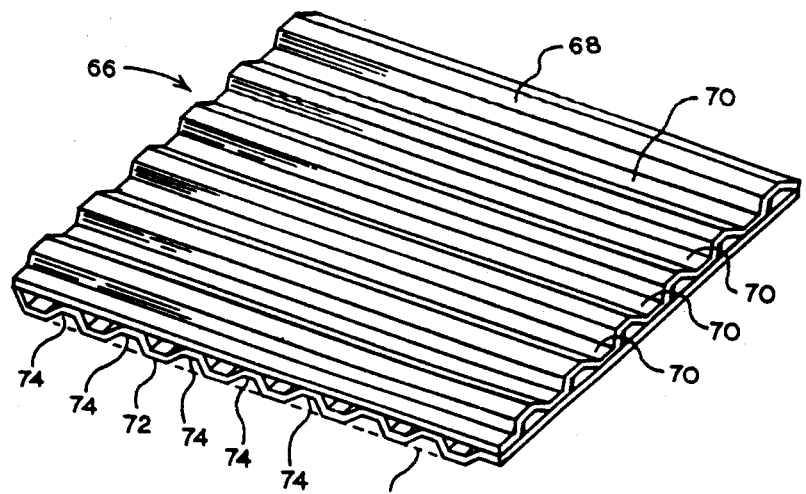

As best seen in FIG. 4, spacing sheet 66 has an upper facing surface 68 having a plurality of generally parallel channels 70 extending generally across the upper surface. A lower facing surface 72 has a plurality of channels 74 extending generally across its lower surface. The upper and lower facing surfaces of spacing sheet 66 are generally defined at the extremities of those surfaces as they are farthest spaced from each other. Thus the upper and lower facing surfaces are physically discontinuous over the areas of channels 70 and 74, but are generally defined as the plane in which the physical upper and lower facing surface elements reside.

Channels 70 and 74 in the upper and lower surfaces respectively are oriented perpendicular to each other in the preferred method of using spacing sheets 66 in the depalletizing operation.

Figure 4A:
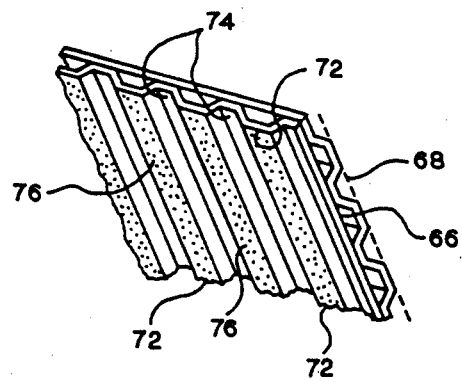
FIG. 4A shows a pictorial view of the bottom of a portion of the spacing sheet of FIG. 4.

As seen in FIG. 4A, elements of lower surface 72 may have projections 76 thereon. The projections may comprise roughness of the surface of the material from which the elements of the lower surface are made. It may alternately include materials adhered to the elements of the lower surface 72. Typical of such materials would be sand, grit, or the like, adhesively attached to the surface elements.

Referring now to FIG. 5, a plurality of spacing sheets 66 is under a plurality of layers of the load. It is seen that upper channels 70 in the upper spacing sheet 66 are oriented in the same direction as upper channels 70 in the lower spacing sheet 66. It will be seen hereinafter that, in some embodiments of the invention, the orientation of channel 70 determines the direction in which the layers are preferably removed from the pallet. Thus when all material is to be moved the same direction, all the spacing sheets 66 should be oriented in the same direction.

Figure 9:
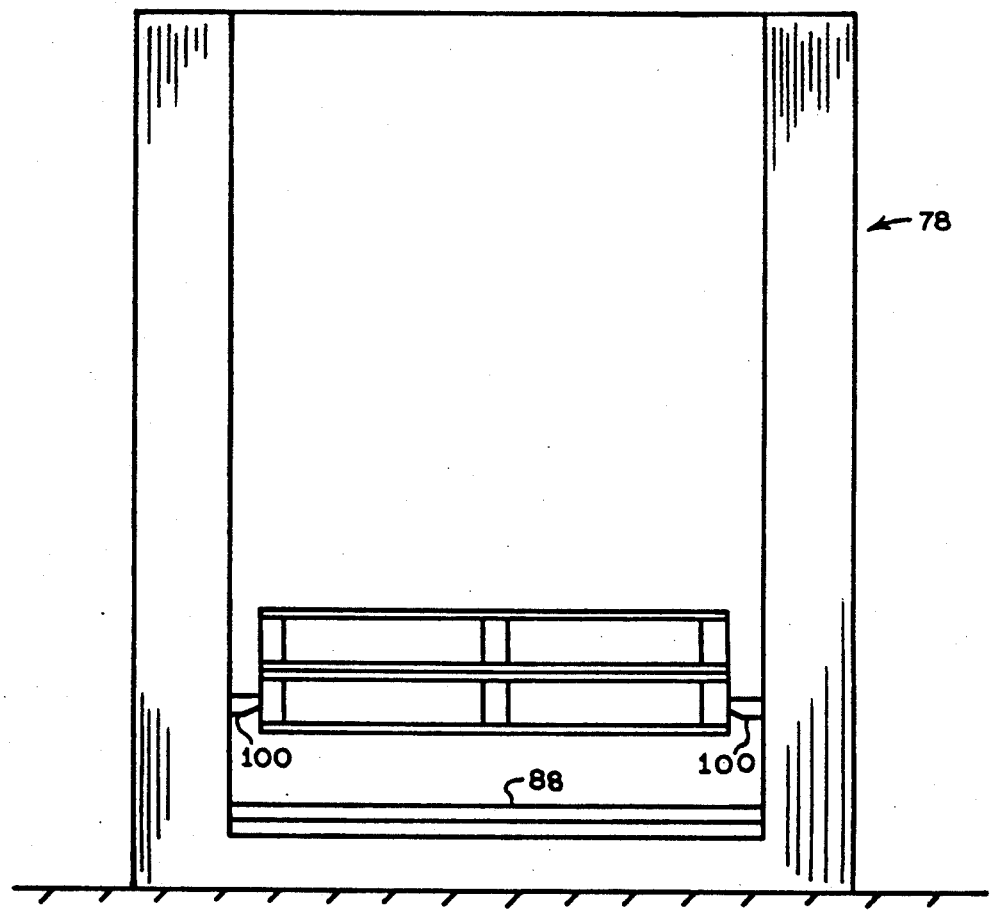
FIGS. 9 and 10 show the suspension of pallets in the pallet collector.
Figure 10:
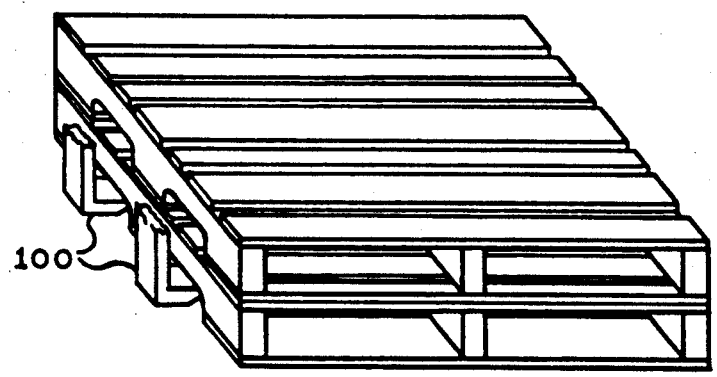
Figure 11:
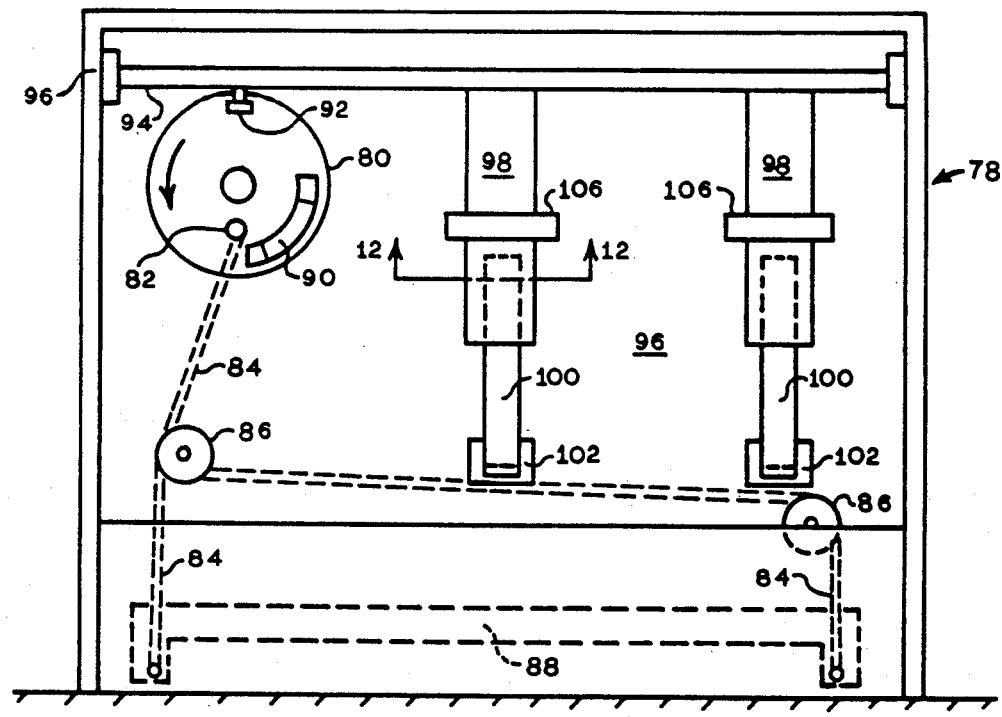
FIGS. 11 and 12 show the mechanical connection between the drive motor, the lifting carriage, and the pallet holding fingers, all in the pallet collector.
Figure 12:
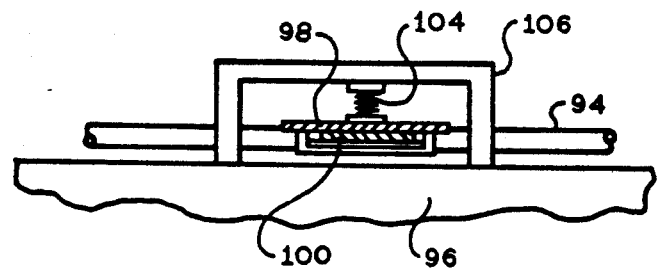

The depalletizer 12 further includes a pallet collector 78 seen in FIGS. 9, 10, 11, and 12. The pallet collector has a drive means not shown connected to a pair of disks 80 on either side of the pallet collector, one of which is shown in FIG. 11. Each disk has a stud 82 connected to a pair of chains 84 which pass around pulleys 86 and are attached to pallet carriage 88. Disk 80 also has a cam 90 which interacts with cam follower 92 as disk 80 is rotated. Cam follower 92 is attached to rod 94 which is rotatably mounted to frame 96 of the pallet collector. Arms 98 extend from rod 94 and hold fingers 100, which extend through slots 102 and project over carriage 88 as seen in FIG. 9. As seen in FIG. 12, spring 104 exerts pressure between bracket 106 and arm 98 such that fingers 100 are normally held, by the pressure of the springs 104, in a position projecting over carriage 88 as seen in FIG. 9. As seen in FIGS. 9 and 10, the fingers 100 are thus urged into the stack of pallets, and hold the pallets as seen in FIG. 10.

When a pallet is received on carriage 88, disk 80 is powered through a single revolution in the direction shown by the arrow on disk 80 in FIG. 11. As the disk rotates, stud 82 lifts on chains 84 thus lifting carriage 88 toward fingers 100 as they project into the pallet receiving area. Cam 90 encounters follower 92 as it reaches the top of the disk during the disk rotation. At about the same time, stud 82 has reached approximately the three o'clock position on disk 80, as it is lifting carriage 88 through chains 84 and pulleys 86. Cam 90 comprises an extra thickness to disk 80. As cam 90 interacts with follower 92, follower 92 is forced outwardly from disk 80, thus rotating rod 94 and thereby retracting fingers 100 through arms 98, from their position over carriage 88; thus providing a clear path for carriage 88 to lift the pallet which is on it into the bottom of the stack of pallets such as that which is seen in FIGS. 9 and 10. By the time stud 82 has reached the top of disk 80 cam 90 is no longer interacting with cam 92, and springs 104 have pushed fingers 100 back into the pallet stack, thus capturing the lower-most pallet in the stack which has been positioned there by carriage 88. With the continued rotation of disk 80, carriage 88 is again lowered to its lower position as seen in FIG. 11; while fingers 100 continue to hold all the pallets including the pallet which has just been newly lifted into the bottom of the stack, thereby making it a part of the stack of pallets.

Figure 11A:
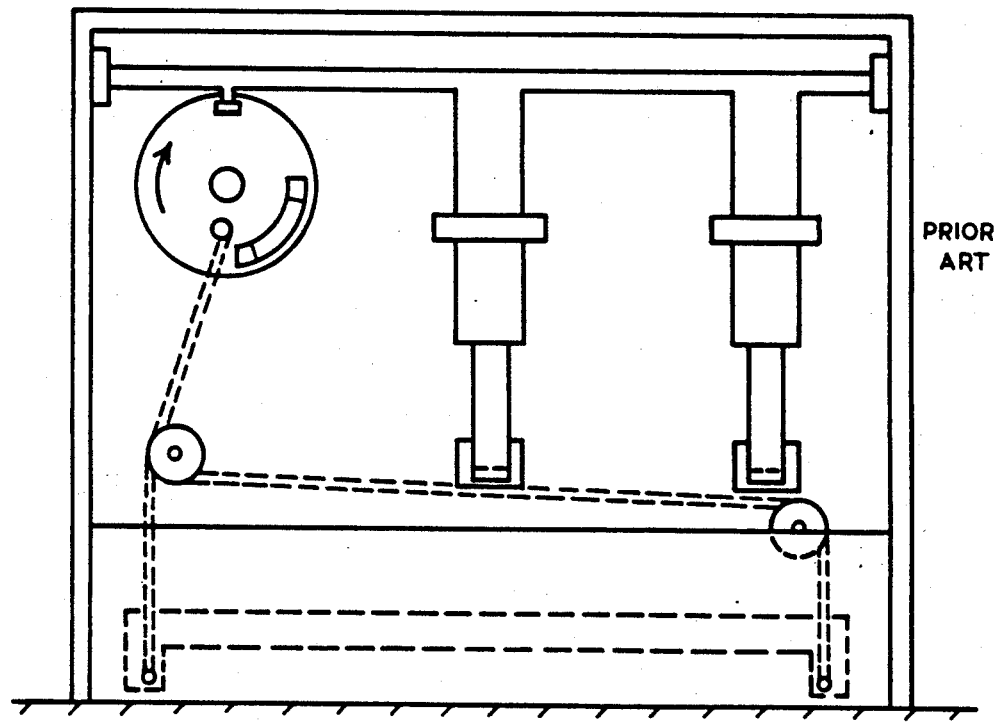
FIG. 11A shows the method of use of such apparatus in the prior art.

The prior art apparatus seen in FIG. 11A is believed to be structurally very similar to the pallet collector of FIGS. 11 and 12. The primary difference known to the inventor is in the operation of the apparatus; wherein the apparatus of the prior art was used as a pallet dispenser and wherein the disk operated in a clockwise manner for first raising the carriage, and while the carriage was in the raised position, camming the fingers out of the pallet stack and then camming them back in as the carriage was lowered. In the pallet collector of the invention disk 80 is rotated counter-clockwise, such that, as the carriage is raised, the fingers 100 are retracted from the pallet stack such that an additional pallet can be added to the stack from the bottom. The pallet fingers are then reinserted into the pallet stack when the carriage is near its uppermost position accompanied by the rotation of the disk.

Referring now to FIGS. 1, 2, 6, and 8, a spacing sheet removal apparatus 108 is attached through appropriate supports to one or more of upper horizontal frame members 33. The spacing sheet remover 108 includes a primary remover frame 110 and a pickup framework 112 including suction cups 114. Pickup framework 112 is suspended from frame 110. Chains 116 extend from framework 112 over pulleys 118 to motor 120. Motor 120 dispenses and winds up chains 116 in raising and lowering pickup framework 112. Pickup framework 112, chains 116, pulleys 118, and motor 120 are slidably mounted on frame 108 such that they can be moved along frame 108 such as to the phantom position as shown in FIG. 2. Thus, as seen in FIGS. 1 and 2, the operation of the spacing sheet removal apparatus 108 is independent of the operation of pusher 36.

FIG. 2 shows the depalletizer with a loaded pallet having been put in location on a pallet table 48 and raised into a position for unloading. The pallet is held in its position by pallet guides 50 which are disposed outside and adjacent opposing ends of the pallet, and which abut opposing vertical end surfaces of the pallet, to thereby retain the pallet in position on the pallet table, all as seen in FIG. 2. The spacing sheet 66 under the top layer 62 of the load is against retainer 34. Referring now to FIG. 6, pusher 36 has been rotated downwardly into contact with the load and is pushing layer 62 of load 22 onto removal conveyor 24. As best seen in FIG. 7, the lower edge 37R of surface 37 of pusher 36 is disposed close to, but spaced from, upper surface 68 of spacing sheet 66. As further seen in FIG. 7, fingers 38 extend into the channels 70 on the upper surface 68 of spacing sheet 66, and are spaced from the surfaces of the channels 70. Accordingly, as seen with respect to FIGS. 3, 6, 7, and 8, surface 37 engages substantially the entire trailing surface of the layer 62 of material being pushed off the load, namely the trailing edges of the corresponding stacks which it contacts, when pusher 36 pushes the layer off the load. By extending below upper surface 68, into channel 70, and by avoiding touching the surfaces of channels 70, fingers 38 engage that minor portion (the bottom sheets) of the trailing surface of layer 62 which is below lower edge 37R and above upper surface 68 of the spacing sheet, and so ensure that those bottom sheets of material in layer 62 are pushed along as part of the layer 62 as the layer is removed from the pallet and onto conveyor 24.

A depalletizing operation will now be described in sequence. A loaded pallet is loaded onto a pallet table. The pallet is positioned through engagement of stops 50. If the respective pallet table 48 on which the pallet has been loaded is not horizontally adjacent removal conveyor 24, such that it can be raised to a position directly adjacent the removal conveyor, then carrier 46 is moved in the appropriate direction to bring the pallet into a position horizontally adjacent removal conveyor 24. "Horizontally adjacent" refers to a position projected onto the floor without respect to the vertical location of the pallet and the removal conveyor. Once the loaded pallet and its pallet table have been brought into a position horizontally adjacent removal conveyor 24, pallet table 48 and the pallet with its load are raised into a position physically adjacent removal conveyor 24 as seen in FIG. 2. In that position the bottom of layer 62 is more or less level with belt 56 on removal conveyor 24. Preferably the bottom of the top layer is slightly above the plane of belt 56. Cylinder 44 is then activated moving pusher 36 into a vertical position. Cylinder 42 is activated retracting rod 40, and drawing pusher 36 with it, thus pushing the top layer 62 off the load 22 and onto removal conveyor 24. As pusher 36 pushes the layer off, fingers 38 extend below the bottom of the layer and into channels 70, to ensure that the bottom members of the layer are moved concurrently. See FIG. 7. While contents of the pallet are being pushed off, retainer 34 abuts spacing sheet 66 along one of its edges, and prevents it, and the rest of the load, from being pushed off the pallet at the same time.

Where loose materials, such as stacks of newspapers, are being depalletized, it is important that retainer 34 be able to restrain movement of materials underlying the material being moved, by means of a spacing sheet. Namely, those skilled in general physical laws of sliding movement will see that the horizontal force generated by the bottom of the layer sliding across the top of the spacing sheet generates a horizontal force on the spacing sheet, which is transferred to the retainer 34 by virtue of its abutment against the spacing sheet in the direction of sliding. In order for retainer 34 to act appropriately on a spacing sheet, the spacing sheet must have enough thickness and rigidity that it can be positioned in surface-to-surface contact with retainer 34, and maintain that contact while the overlying layer is being removed, without slippage, buckling, or other damage to the spacing sheet or the retainer. A minimum thickness for spacing sheet 66 is about 0.25 inches. Thinner spacing sheets could conceivably be used, but the difficulty in properly locating them vertically with respect to retainer 34 makes their use impractical. A spacing sheet having a thickness of 0.375 inches is better. 0.75 inches is preferred, and thicknesses as high as 1 inch are contemplated as being practical. Thickness greater than 1 inch will work, but spacing sheets of those designs would be excessively costly and would unnecessarily increase the overall height of the pallet loads in which they are used and so are not preferred.

After the top layer is removed, pallet table 48 is raised to an appropriate height for removal of the underlying layer. Pickup framework 112 of spacing sheet remover 108 comes down to spacing sheet 66 and picks it up by suction cups 114. After spacing sheet 66 is adequately raised, it is moved laterally away from the pallet load as seen in phantom in FIG. 2 and is lowered onto the stack 122 of spacing sheets.

After the spacing sheet has been removed, pusher 36 pushes the remaining layer 62 off the pallet in a manner similar to the pushing off of the previous layer. The remaining spacing sheet is removed as described above. Pallet table 48 then returns to its lowered or home height, as expressed at 48L for a different pallet in FIG. 2. After the pallet table 48 has been returned to its lowered position, empty pallet 124 is engaged by a pop-up conveyor, elements of which are seen in phantom at 125 in FIG. 3, and moved laterally away from pallet table 48 by pallet conveyor 126 to pallet collector 78.

In the pallet collector, the pallet is lifted up into the bottom of a stack of pallets by carriage 88, and stack holding fingers 100 engage the pallet, holding it at the bottom of the stack, and above the lowered height of the carriage 88; high enough to provide clearance for the next empty pallet from the depalletizer; all as described hereinabove for the operation of the pallet collector.

As material is pushed off a pallet load, it is deposited onto removal conveyor 24 which is moving from right to left as seen in FIGS. 2, 6, and 8, and according to the arrows in FIG. 3. On conveyor 24, the material is traveling more or less in rows across the width of the conveyor. When the material reaches the discharge end of removal conveyor 24 (hidden by post 32 in FIGS. 2, 6, and 8; see FIG. 3), it is deposited onto spacing conveyor 26. Spacing conveyor 26 is driven at a higher speed than removal conveyor 24, thus increasing the distance between subsequent rows of material. Spacing conveyor 26 discharges the material onto take-away conveyor 28, which is driven in a direction generally perpendicular to the direction of conveyors 24 and 26. See FIGS. 1 and 3. A row of material traversing spacing conveyor 26 side-by-side becomes a front-to-back line of material traversing take-away conveyor 28 because of the perpendicular change in direction. The increased spacing between rows which is provided by the greater speed of spacing conveyor 26 provides time for a line of material on take-away conveyor 28 to clear the receiving area on conveyor 28 by the time the next row arrives from spacing conveyor 26. The relative speeds of the conveyors may, of course, be adjusted for the desired timing. In some cases the spacing conveyor 26 is preferably a pop-up conveyor, and it may comprise a plurality of O-belts as the conveying means.

THE DISTRIBUTOR

Figure 13:
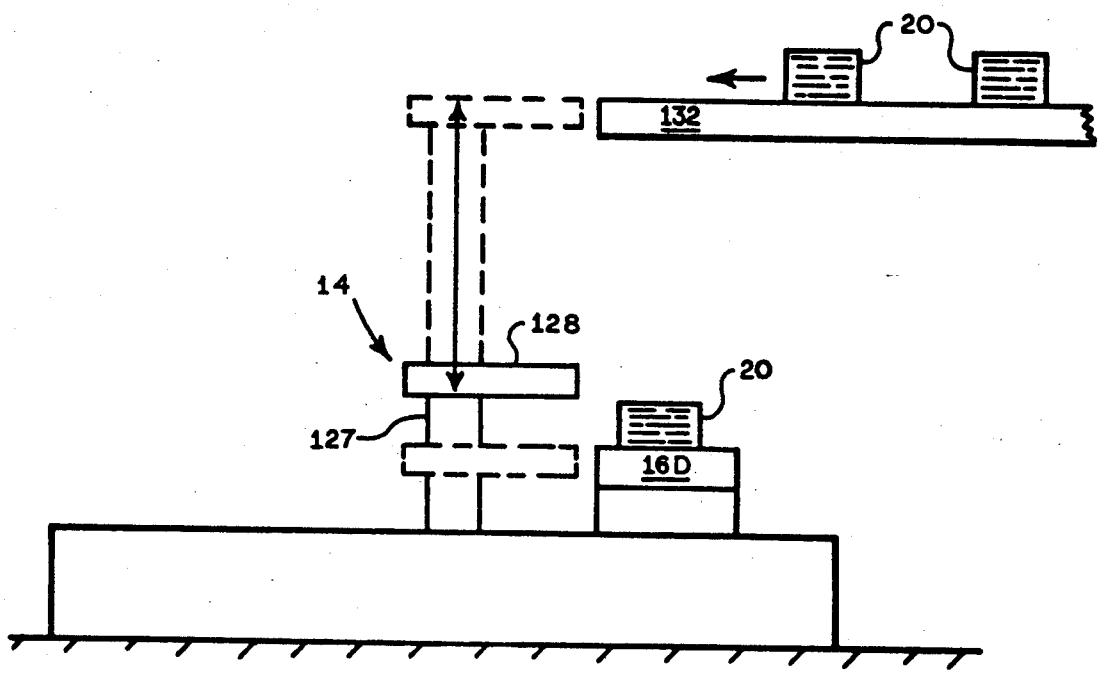
FIG. 13 show the side elevation view of a material distributor of this invention.

Distributor 14 is shown in top view in FIG. 1 and in side elevation view in FIG. 13. Distributor 14 has a vertical member 127 to which is mounted a staging area 128. Vertical member 127 is capable of rotation about its vertical axis such that staging area 128 may be presented to any of a plurality of workstations 16. Referring to FIG. 1 workstations A, B, C, and D have accumulators 130 for association with distributor 14. The remainder of workstations 16 have accumulators 130, not shown.

As seen in FIG. 13 distributor 14 also has the capability of changing the elevation or height, of staging area 128.

In operation of distributor 14, the staging area 128 is raised to its uppermost position shown in phantom in FIG. 13 where it receives loads of materials, such as stacks of paper 20, from conveyor 132. After receiving a load of material from conveyor 132, the staging area 128 is lowered and rotated about its vertical axis to an angular position for feeding the load to a workstation such as is seen in phantom in FIG. 1. Rotation may take place any time after leaving the upper elevation and before arriving at the lowest elevation, and may include the case of a static intermediate elevation for the rotation, as seen in FIG. 13. In the embodiment shown in FIG. 1, which is also seen in FIGS. 14 and 16-18, the receiving area of the workstation is accumulator 130. Distributor 14 distributes the load to accumulator 130, after which it returns to its position adjacent conveyor 132 for receiving the next load, going through the height adjustment and rotation about the vertical axis in the process. As seen in FIGS. 14 and 16-18, staging area 128 of distributor 14 is a conveyor. Specifically staging area 128 is preferred to be a two-way driven conveyor; such that the conveyor is driven in the same direction as conveyor 132 when the material is received from conveyor 132 and is driven in the opposite direction when it distributes material to the accumulator 130.

THE HOPPER LOADER

Figure 14:
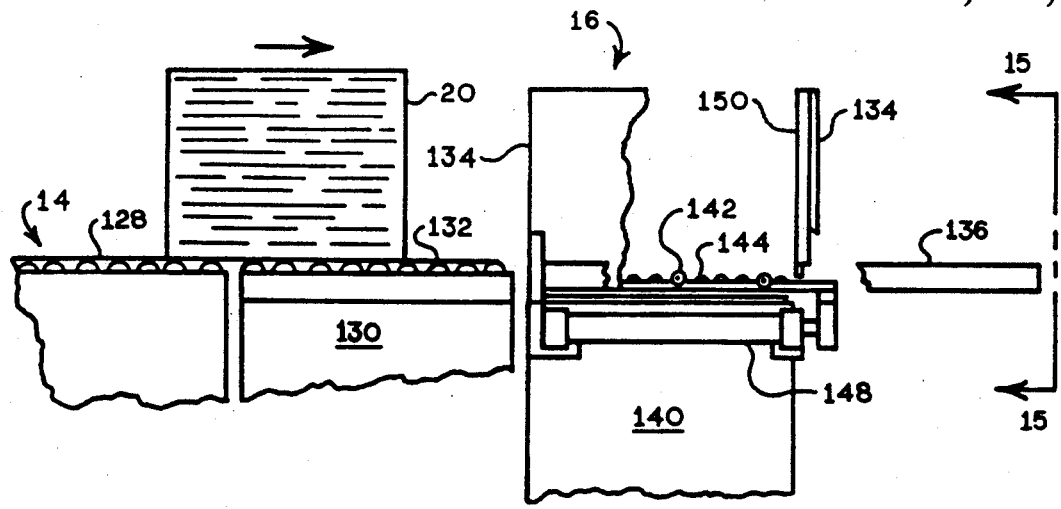
FIG. 14 show a partially cut-away side elevation view of a hopper loader of the invention.
Figure 15:
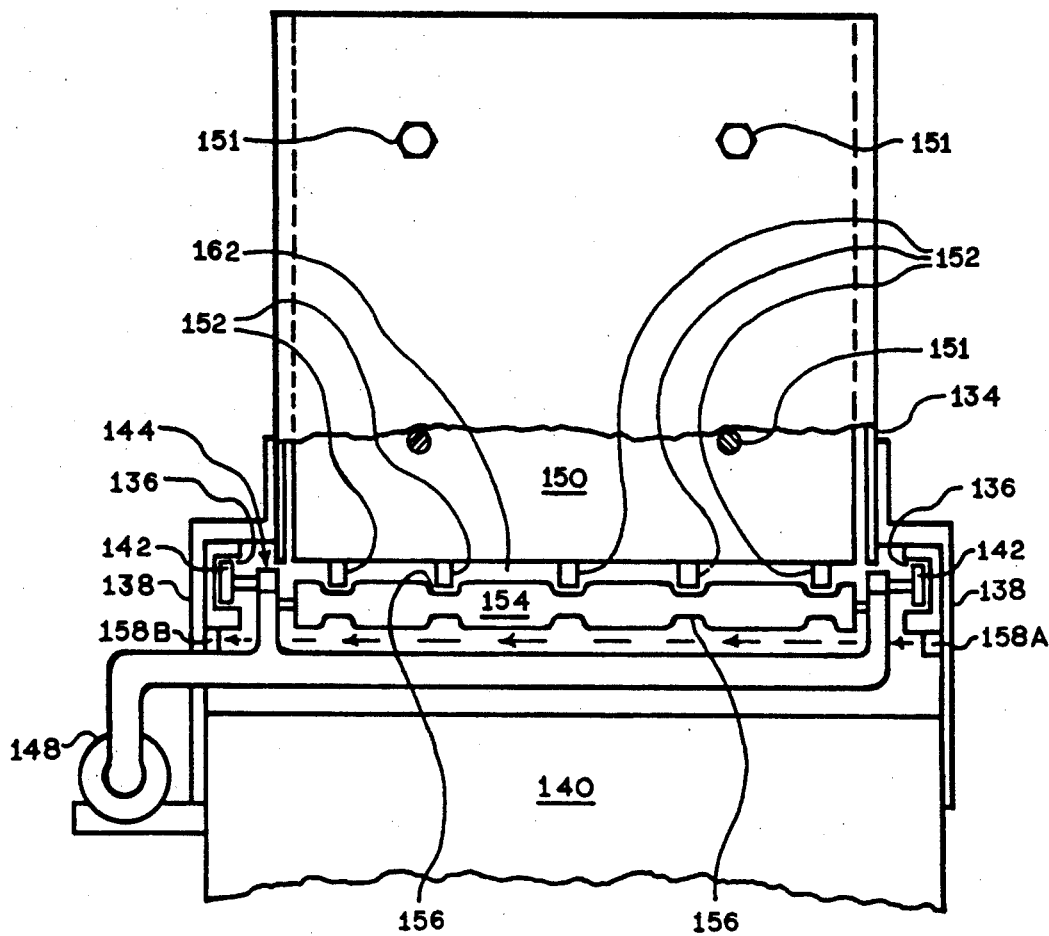
FIG. 15 shows the hopper loader of FIG. 14 taken at 15—15 of FIG. 14.
Figure 17:
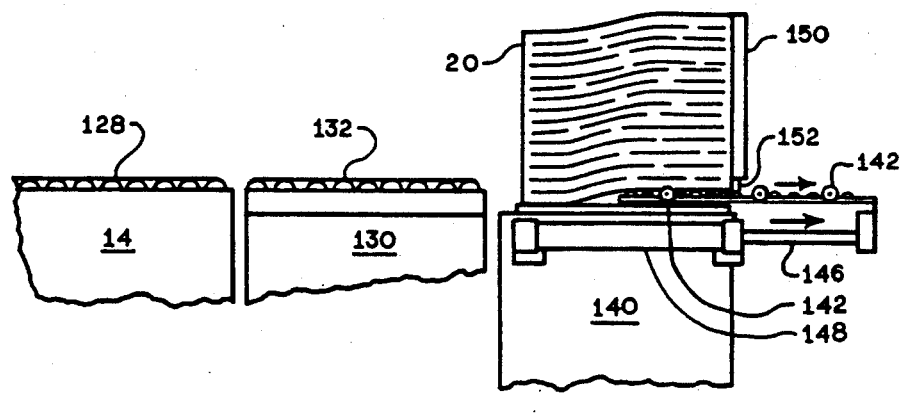
Figure 18:
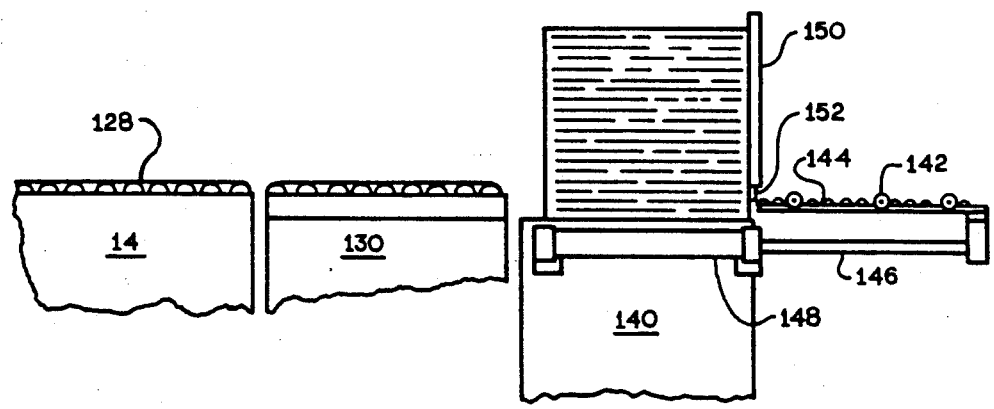
FIG. 18 shows the hopper loader in its rest position during the feeding of the material through the hopper.

Hopper loader 16 is seen in the general layout of the material handling system, and showing its overall relationship to the rest of the system, in FIG. 1. The hopper loader has a frame 134. Channels 136 are mounted to frame 134 through brackets 138 which also mount the entire hopper loader to hopper 140. Wheels 142 ride in channels 136 and suspend receiving conveyor 144 from channels 136 and over hopper 140. Receiving conveyor 144 may be moved laterally with respect to hopper 140 by the extension of rod 146 of cylinder 148 as seen in FIGS. 17 and 18. Cylinder 148 is mounted to hopper 140. Retainer 150 is attached to frame 134 by fasteners 151 as seen in FIGS. 14 and 15, and has fingers 152 disposed from one edge thereof toward receiving conveyor 144. Rollers 154 on conveyor 144 have channels 156 formed into their circumference, such that they accommodate and receive fingers 152. A detector 158 preferably having a sender 158A and a receiver 158B is positioned below receiving conveyor 144 and above the top of hopper 140. Arrows between the sender and receiver show line-of-sight travel of signals.

Frame 134 has been deleted from the hopper loader in FIGS. 17 and 18 for clarity.

Figure 16:
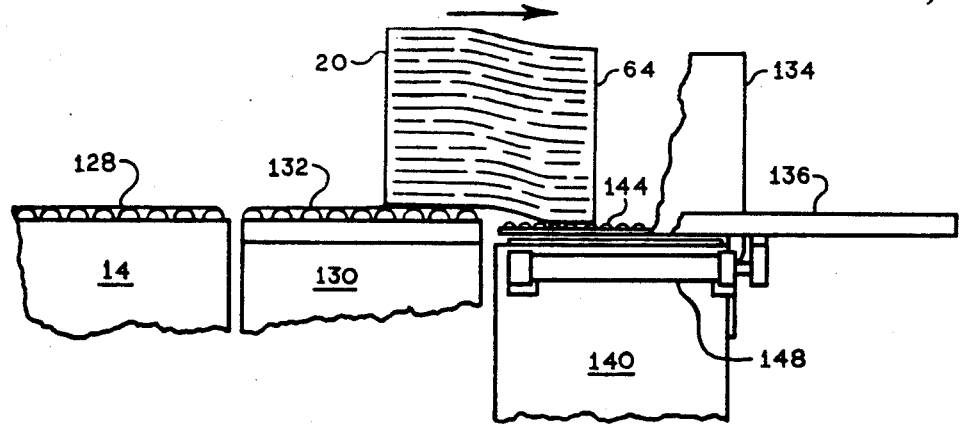
FIGS. 16, and 17 show the hopper loader of FIGS. 14 and 15 in operation, as it receives a stack of material and loads it into the hopper.

FIG. 14 shows a stack of material being received from staging area 128 of distributor 14 onto accumulator 130. As shown in FIG. 14 the loader receiving conveyor 144 is positioned over the hopper loader and in a position to receive the stack of material from accumulator 130. FIG. 16 shows the material being received onto receiving conveyor 144 from driven conveyor 132 of accumulator 130. When the stack of material 20 has been received from accumulator 130, cylinder 148 is activated, extending rod 146 and moving receiving conveyor 144 laterally out from under stack 20. Stack 20 is prevented from moving with conveyor 144 as it abuts retainer 150. Fingers 152 extend into channels 156 in conveyor 144 and prevent the bottom-most layers of material from escaping through the clearance gap 162 between retainer 150 and conveyor 144.

As seen in FIG. 18, conveyor 144 has been withdrawn from over hopper 140. Conveyor 144 remains in the position shown in FIG. 18 until the load in hopper 140 has been reduced to the point where the top of the load is below the bottom of conveyor 144. At that point detector 158 detects that the load in the hopper is below conveyor 144 and initiates movement of conveyor 144 back over the hopper as in FIG. 14 such that it is ready to receive another load. The normal rest position, then, of conveyor 144, while hopper feeding is in operation, is that shown in FIG. 18. When the detector detects that the top of the material in the hopper is below the level indicated, elevator 144 is moved to the position shown in FIG. 14 for receiving another load. Typically as soon as conveyor 144 reaches the position shown in FIG. 14 another load is placed on it as shown in FIG. 16 and that load is then loaded into the hopper as in FIGS. 17 and 18.

THE MATERIAL HANDLING SYSTEM

The overall system of handling material may start as early as the operation of putting the material on the pallet, wherein the spacing sheets of the invention are used in order to provide for appropriate depalletizing operations. Loaded pallets 22 are placed on depalletizing tables 48. Loaded pallets 22 are seen prior to being placed on tables 48 in FIG. 1. Two pallets are seen having been placed on the pallet tables in FIG. 2. One of the pallets has been raised to a position for the depalletizing operation to proceed. The other pallet is seen at the lower level.

As the depalletizing operation is proceeding, pusher 36 rotates to its vertical position and pushes material off pallet load 22 as seen in FIG. 6. As the depalletized material is taken away by conveyors 24, 26, and 28, the pallet table 48 is further raised into a position for removal of the next layer of material from the pallet load. The spacing sheet remover decends and removes the spacing sheet. Pusher 36 then pushes the next layer of material off the pallet. After the last layer of material has been removed from the load, the spacing sheet remover removes the last spacing sheet, table 48 is lowered and the empty pallet 124 is deposited onto conveyor 126 and carried into the pallet collector where it is received into the stack of pallets. Pallet carrier 46 then moves another pallet table into position for depalletizing as in FIG. 2.

In the meantime the depalletized material has been traveling along take-away conveyor 26 and is delivered to the appropriate ones of accumulators 18A through 18D. As seen in FIG. 1, accumulators 18A–18D are arranged in parallel. As seen from the arrows in FIG. 1, showing direction of transport of material through the accumulators 18A, 18B, 18C, and 18D, the load material is transported from conveyor 28 to conveyor 132 through any selected one of accumulators 18A–18D. Since, as seen in FIG. 1, all the accumulators transport the material from the same infeed conveyor, in the same direction, to a common outlet conveyor 132, a given load element, for example a stack 20, will traverse only one of the accumulators 18A–18D. Material is released from accumulators 18 onto conveyor 132 for delivery to distributor 14, according to the needs of distributor 14 and at workstations 16. Material released from accumulators 18 travels along conveyor 132 toward distributor 14 and is deposited on distributor 14. As material is received onto the staging area 128 of distributor 14 the two-way conveyor of staging area 128 is activated in order to receive the material and position it properly on the staging area. Distributor 14 then changes the elevation of staging area 128, rotates to the appropriate workstation, and reverses direction of the two-way conveyor, thus delivering the material to the appropriate workstation 16 at its accumulator 130. As the material is delivered from distributor 14 by an activation of its two-way conveyor on staging area 128, driven conveyor 132 on accumulator 130 is likewise activated in order to receive the material. The material is then delivered to the hopper loader as called for by the hopper loader.

The operation of the depalletizer as seen in FIGS. 2, 6, and 8, shows the unloading of all the material from one pallet. Alternatively, less than all of the material may be removed from one pallet load, after which that pallet load may be removed from the feed station seen in FIGS. 2, 6, and 8, and another pallet load may be presented for unloading. In this way, parts of pallet loads may be removed sequentially in order to deliver and distribute materials in the order in which they are needed. As seen in FIG. 1, a pallet load on pallet table 48A may be delivered to the depalletizer feed station as seen in FIG. 2, partially unloaded, and a pallet load on table 48B then presented and some of its load removed. Thus the process contemplates the partial unloading of one or more pallets without totally unloading a pallet. As the materials are unloaded, they may be sequenced into the appropriate accumulators. For example materials from pallet table 48A may be sequenced into accumulator 18A, material from pallet table 48B may be sequenced into accumulator 18B, etc.. The appropriate materials may then be selected from the accumulator 18 and delivered to distributor 14 for distribution to the appropriate workstation 16.

It is anticipated that the depalletizing operation will typically be performed at a substantial vertical elevation, such as 6 to 10 feet above the floor. The material handling system may be designed for bringing the depalletized material to within normal working height, such as 2-4 feet above the floor, at any of a plurality of locations. As shown in FIG. 13, the material is preferably lowered at distributor 14.

In connection with the depalletizing being done at elevation, there are a plurality of possibilities for sequencing pallet loads and feeding them into the depalletizer feed station, especially when pallets are being sequenced out of the feed area with part of the load still on the pallet. For example, all loaded pallet tables could be raised to a general unloading height and held by an upper carrier, such that the primary movement to the depalletizer feed station would be horizontal. In that embodiment, the pallet tables would be lowered for loading and unloading pallets and their respective loads, as appropriate. In general, though, in that embodiment, the loaded pallet tables would generally be at the appropriate elevation for removing the pallet load.

Thus it is seen that the invention provides apparatus and methods for automatically unloading material, and especially stacks of loose material such as newspaper from a pallet. It is seen that the most efficient unloading begins with a method of loading the pallet which is conducive to easy unloading. It is further seen that there is provision in the invention of apparatus and process for distributing stacks of material to selected ones of a plurality of workstations.

Further there is provided apparatus and process for loading stacks of material into a hopper.

Finally there is provided a system of handling material which provides for depalletizing material, transporting it to a subsequent workstation, which may be selected from a plurality of workstations, and loading it into a hopper at the workstation.

Having thus described the invention, what is claimed is:

1. Depalletizing apparatus for removing a load of material from a pallet, the load comprising at least one layer having a trailing surface, said trailing surface having a height dimension and a width dimension, comprising:
   (a) means for pushing the load in a predetermined direction from the pallet one layer at a time at a predetermined feed location, said pushing means having a substantially continuous pushing surface
      (1) having height and width dimensions generally coextensive with those of said load layer trailing surface, and,
      (2) having a lower edge and a plurality of laterally spaced fingers depending from said lower edge,
   (b) a spacing sheet under each layer of said pallet load, said sheet having an upwardly facing surface provided with a plurality of generally parallel spaced channels thereacross and with uppermost sheet portions therebetween disposed against the bottom surface of a load layer thereon, said channels being disposed in general alignment with said predetermined load pushing direction and having a spacing corresponding substantially to that of said fingers,
   (c) means for positioning the pallet having the load in a predetermined load layer removal location with respect to said pushing means to dispose said lower edge of said continuous pushing surface close to but spaced from said uppermost spacing sheet portions with said fingers engaging a minor lowermost portion of said layer trailing surface, and with said fingers extending into said channels of said spacing sheet and beneath the lower surface of said load layer, and,
   (d) means precluding movement of said spacing sheet in said predetermined push direction,
   whereby said load layer is readily and fully pushed from said pallet to leave said spacing sheet thereon for subsequent handling.

2. Depalletizing apparatus as in claim 1 and including means, independent of said pushing means, for receiving a spacing sheet from the top of a pallet load.

3. Depalletizing apparatus as in claim 2 and including spacing sheet removal apparatus for simultaneously moving said spacing sheet laterally with respect to both said pallet load and said pushing means.

4. Depalletizing apparatus as in claim 1, the pallet being held in said predetermined feed location by a pallet holding means, said depalletizing apparatus including:
   a pallet take-away conveyor adapted to remove an empty pallet from said pallet holding means,
   pallet collecting means including a carriage lift means adapted to lift a pallet from a lower position of said carriage lift means into the bottom of a stack of pallets,
   pallet stack holding means adapted to be placed in a pallet holding position, and thereby to hold a stack of pallets above said carriage lift means, as determined when said carriage lift means is in said lower position, and
   means for retracting said pallet stack holding means from said pallet holding position as said carriage lift means lifts a pallet into the bottom of a stack of pallets held by said stack holding means.

5. Depalletizing apparatus as in claim 1, said apparatus comprising first and second pallet tables, each said pallet table being adapted to present corresponding first and second pallet loads to said predetermined feed location, each such pallet load comprising a pallet and a product contained thereon, said depalletizing apparatus further comprising (i) means for unloading a first portion of the first load from the first pallet, at said predetermined feed location whereby the first pallet maintains a second portion of the load thereon, and (ii) a carrier adapted to remove said first pallet table, holding the first pallet and the second portion of the load thereon, from said predetermined feed location, and adapted to place the second pallet load contained on said second pallet table, in said predetermined feed location, whereby at least a first portion of the second pallet load can be removed from the second pallet prior to the removal of the second portion of the first load from the first pallet, such that parts of the first and second pallet loads can be removed sequentially.

6. Depalletizing apparatus as in claim 5 and including a plurality of accumulators beyond the discharge locus of said removal conveyor means, said plurality of accumulators being disposed such that all said accumulators transport the load material from said removal conveyor, as a common feed, to a common outlet conveyor, whereby a given load element traverses only one of said accumulators between said removal conveyor and said outlet conveyor.

7. Depalletizing apparatus as in claim 1 wherein said spacing sheet is between about 0.25 inch and about 1 inch thick.

8. The depalletizing apparatus of claim 1 further including retractable pallet guides disposed on opposite sides of said pallet in engagement with vertical faces thereof to retain said pallet at said load removal location against forces urging the pallet against said guides.

9. The depalletizing apparatus of claim 1 further including a plurality of vertically stacked load layers on said pallet, and wherein said positioning means effects seriatim removal of said load layers.

10. The depalletizing apparatus of claim 1 further including removal conveyor means disposed adjacent said pallet for receiving the pushed load layer therefrom.

* * * * *